United States Patent

[11] 3,629,822

[72] Inventor Donn A. Johnson
Dayton, Ohio
[21] Appl. No. 1,405
[22] Filed Jan. 8, 1970
[45] Patented Dec. 21, 1971
[73] Assignee The National Cash Register Company
Dayton, Ohio

[54] MICR DOUBLE FEED DETECTOR
7 Claims, 5 Drawing Figs.

[52] U.S. Cl. .......... 340/146.3 C, 340/259, 235/61.11 D, 179/100.2 B
[51] Int. Cl. .......... G06r 9/18, G11b 27/00
[50] Field of Search .......... 178/42; 340/259, 174.1 B; 271/57; 235/61.11, 61.11 D; 179/100.2 B, 100.2 C

[56] References Cited

UNITED STATES PATENTS

| | | | |
|---|---|---|---|
| 2,873,319 | 2/1959 | Mee | 179/100.2 |
| 3,182,301 | 5/1965 | Kolb | 340/259 |

OTHER REFERENCES

IBM Tech. Discl. Bull.: Magnetic Tape Recording, by Haines, Vol. 3, No. 6, November 1960, page 19.

*Primary Examiner*—Thomas A. Robinson
*Attorneys*—Louis A. Kline, John J. Callahan and Harry W. Barron

ABSTRACT: In a magnetic ink character recognition (MICR) reading system, there is provided a pair of transducer reading heads for reading magnetic characters imprinted on one surface of a document. One head scans the surface having the characters on it, and the other head scans the opposite surface. Delaying, amplifying, and filtering circuits are provided to make the signals provided by each head equal in time and magnitude and opposite in polarity if only one document is being read. These signals are then added, and their sum is rectified and applied to a threshold circuit. When one document is read, the magnitude of the sum is below the threshold voltage, and nothing results. However, when multiple documents are read, the magnitude of the sum is above the threshold voltage, and the threshold circuit causes a signal to be provided which sends the multiple documents to a reject pocket or slot in the reading system.

INVENTOR
DONN A. JOHNSON

BY

HIS ATTORNEYS

INVENTOR
DONN A. JOHNSON

BY Louis A Kline
John J. Callahan
Harry W Barron

HIS ATTORNEYS

MICR DOUBLE FEED DETECTOR

This invention relates to magnetic ink character recognition (MICR) and more particularly to a MICR double-feed detector.

In MICR reading systems, such as a check sorter used in a commercial bank, a document having characters, such as numbers and coded symbols, written in special ink which is capable of being magnetized is fed through apparatus which includes means to magnetize the ink character and additional means to scan the magnetized character and provide an analog signal unique to that character. This analog signal is applied to a tapped delay line, and each of the tapped outputs of the delay line is applied to a plurality of character recognition circuits. Each of the character recognition circuits recognizes an analog waveform unique to one character written on the document. A system such as the one briefly described herein is more fully described in U.S. Pat. No. 2,924,812, which issued Feb. 9, 1960, on the application of Philip E. Merritt and Carroll M. Steele.

For the MICR system to operate properly, it is desirable that only one document at a time be processed. Thus, it is desirable to provide means to identify a situation in which multiple documents are fed into the reader and to apply a signal which results in corrective action being taken.

In accordance with a preferred embodiment of this invention, there is provided a double feed detector which includes a first and second reading means for reading magnetic characters on a document. One of these reading means reads the characters from one surface of the document, and the other of the reading means reads the characters from the other surface. Output means are included for providing an output signal whenever the signals produced by the two reading means do not have a given relationship therebetween.

A preferred embodiment of the invention is hereinafter described, in which reference to the following figures will be made. In the figures.

Figure 1:
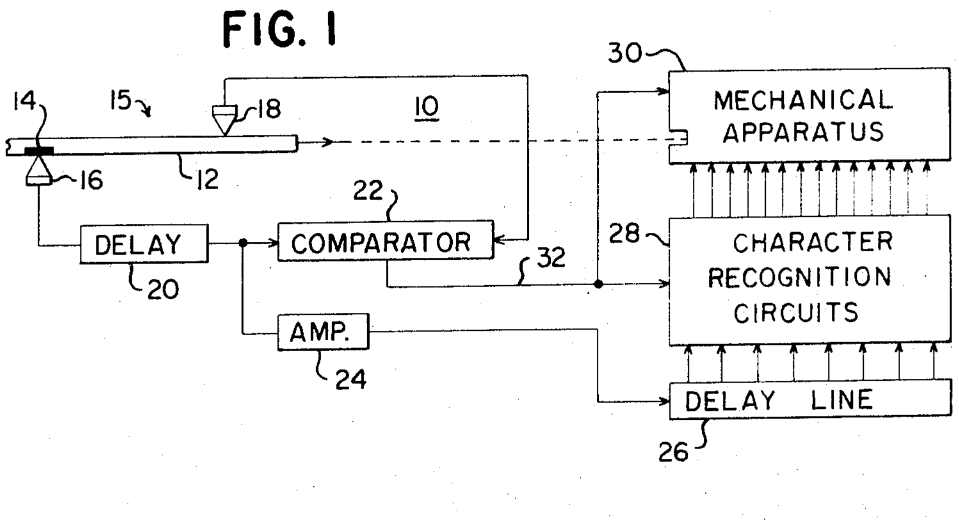
FIG. 1 shows a block diagram of an MICR document reading system in which a single document is read.

FIG. 1 shows an MICR document reading system 10, in which a document 12, such as a blank check having a magnetized character 14 printed on one side thereof is scanned in a reading station 15 by two transducer reading heads 16 and 18. Each of the heads 16 and 18 provides an analog signal which corresponds to the character 14. If the character 14 were changed, the analog signal would change. The head 16 is so positioned that it scans the document 12 on the side on which the character 14 is printed, and thus scans the character directly. The signal provided by the head 16 will be referred to herein as having a normalized magnitude. The head 18, in the other hand, scans the document 12 on the side opposite to the one having the character 14 thereon, and thus the head 18 is separated from the magnetized character 14 by an amount equal to the thickness of the document 12. This separation between the head 18 and the character 14 results in the signal provided by the head 18 having a magnitude of approximately 50 percent of the normalized magnitude.

The signal from the head 16 is applied to a delay network 20, which provides a delayed version of the reading head 16 signal. The amount of the delay is directly proportional to the distance separating the reading head 16 and the reading head 18 and inversely proportional to the speed at which the document 12 travels across the heads 16 and 18. Thus if the two reading heads were closer together, or if the speed was faster, the delay would be less than if they were farther apart or if the speed was slower.

The signal provided by the delay network 20 is applied to one input of a comparator circuit 22. The signal provided by the head 18 is applied to a second input of the comparator circuit 22. The comparator circuit 22 compares signals applied to it, and, if they have a fixed relationship with respect to one another, a signal indicating this will be provided thereby. Such a signal could be a zero volt DC signal. In this instance, only a single document, such as the document 12, is being passed through the MICR reader. However, if the signals applied to the comparator circuit 22 do not have this fixed relationship, multiple documents are being read, and an inhibit signal indicating this will be provided, which lasts for the time necessary to process the document 12. Such a signal could be positive DC voltage.

The output signal from the delay network 20 is further applied through an amplifier 24 to a tapped delay line 26. The amplifier 24 is designed to have an amplification factor to compensate for the attenuation due to the delay network 20. The various outputs of the tapped delay line 26 are applied to a plurality of character recognition circuits 28, one of which recognizes which character the analog signal provided by the reading head 16 corresponds to. Once the character recognition circuits 28 identify a character, it provides a signal at one of its outputs. This signal causes the mechanical apparatus 30 to process the document 12 in accordance with the character 14. A more detailed explanation of the tapped delay line 26 and the character recognition circuits 28 is given in the above-noted Merritt et al. United States patent.

The signal provided by the comparator circuit 22 is applied over a line 32 to the character recognition circuits 28 and the mechanical apparatus 30 to inhibit these components whenever the signal provided by the comparator circuit 22 indicates that a multiple document is being read.

Figure 2:
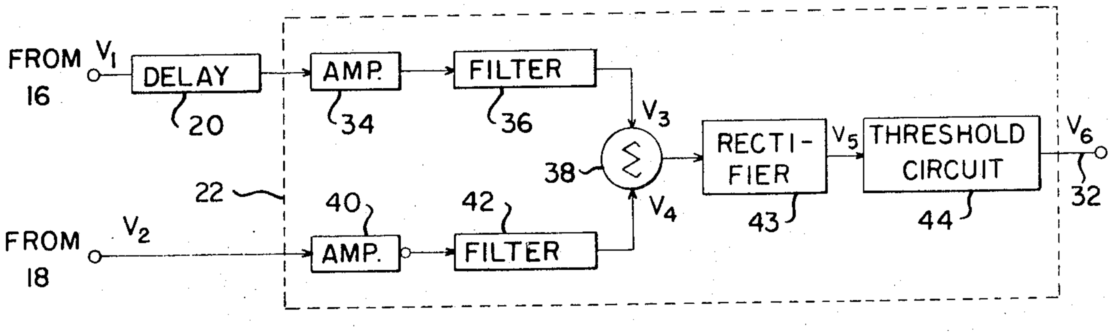
FIG. 2 shows a schematic diagram in block form of the electrical circuitry associated with the system shown in FIG. 1.

Referring now to FIG. 2, there is shown in block form the electrical circuitry for detecting when multiple documents are being read and for providing a signal so indicating. Where possible, like numerical designations have been given in FIG. 2 for the corresponding elements shown in FIG. 1. As explained above, the output from the head 16 is applied to the delay network 20, and the output signal from the delay network 20 is applied to the comparator circuit 22. The comparator circuit 22 includes a noninverting amplifier 34, which is responsive to the delay network 20 signal. The output of the amplifier 34 is applied through a filter 36 to one input of an adder circuit 18.

The signal from the head 18 is applied to the input of an inverting amplifier 40. The output signal from the inverting amplifier 40 is applied through a filter 42 to the other input of the adder circuit 38. The output signal from the adder circuit 38 is applied through a rectifier 43 to a threshold circuit 44. The rectifier 43 merely inverts any negative signal applied thereto, so that a positive signal is always applied to the threshold circuit 44. It may be a full wave rectifier. The output of the threshold circuit 44 is the output of the comparator circuit 22 and, as explained above, it is applied through the line 32 to the character recognition circuits 28 and the mechanical apparatus 30.

The threshold circuit 44 is a circuit which provides a positive signal when the signal applied to its input rises above a certain threshold value, $V_T$, and a zero signal otherwise. Such a circuit could include a Schmitt trigger and a monostable multivibrator.

The noninverting amplifier 34 is set to have an amplification factor which will compensate for the attenuation of the signal from the head 16 due to the delay network 20. The inverting amplifier 40, on the other hand, is set to have a gain of approximately two, because, as explained above, the magnitude of the signal read by the magnetic head 18 is approximately 50 percent of the normalized magnitude of the signal as read by the magnetic head 16, due to the paper thickness. In practice, both amplifiers 34 and 40 will be so adjusted that the signals which they respectively provide are substantially identical although of opposite polarity when a single document is being read.

The filters 36 and 42 are included in the comparator circuit 22 to accommodate for the differences in frequency response caused by the head gap to ink distances of the heads 16 and 18. The high-frequency components are attenuated by the greater distance of ink to the head 18, and the filters are arranged to equalize the signals from the two heads.

Thus the signals applied to the adder circuit 38 should be, in the case where the reading system 10 is reading a single document, identical in magnitude and time relationship and opposite in polarity. In this situation, the output of the adder circuit 38 should be zero, and no signal will be available to trigger the threshold circuit 44.

Figure 3:
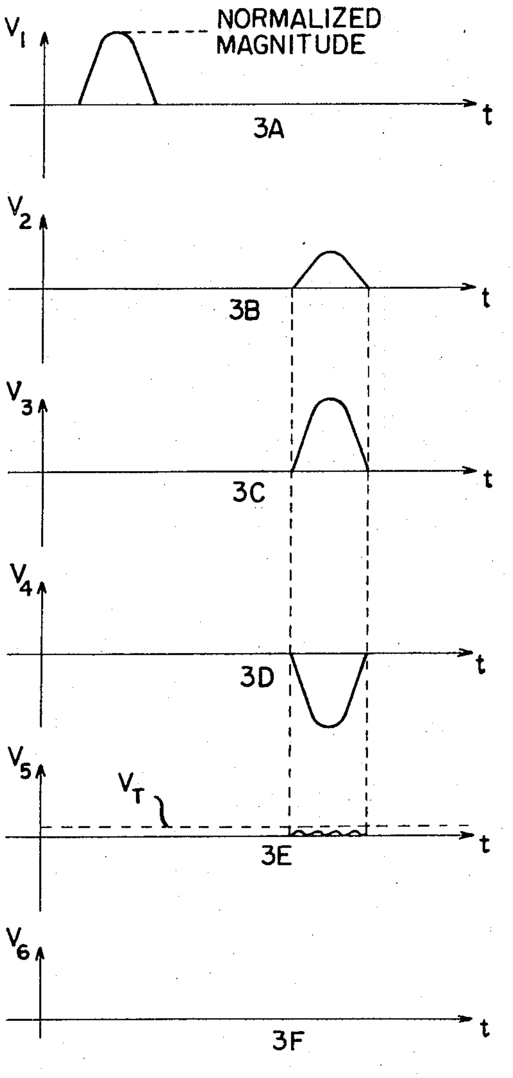
FIG. 3 shows a series to waveforms useful in understanding the operation of the circuit shown in FIG. 2 when a single document is being read.

Referring now to FIG. 3, several different waveforms are shown which are useful in understanding the operation of the circuit shown in FIG. 2, where a single document is being processed. For convenience, the signals represented in FIG. 3 (and FIG. 5, to be discussed hereinafter) have been respectively designated as $V_1$ to $V_6$. In FIG. 2, signal $V_1$ is the analog output signal from the reading head 16; signal $V_2$ is the analog output signal from the reading head 18; signal $V_3$ is the signal applied to the adder circuit 38 from the filter 36; signal $V_4$ is the signal applied to the adder circuit 38 from the filter 42; signal $V_5$ is the signal provided by the rectifier 43; signal $V_6$ is the signal provided by the threshold circuit 44.

Signal $V_1$ represents an arbitrary character being read from the document 12 at some given time by the head 16 and is seen in FIG. 3A. In actual practice, these signals would have both positive and negative magnitudes, but, for the sake of simplicity, signals having only positive magnitudes are shown. Signal $V_2$, as seen from FIG. 3B, is the same signal being read by the head 18, and, as seen by comparing FIGS. 3A and 3B, it occurs later in times and is of approximately one-half the magnitude of signal $V_1$.

FIGS. 3C and 3D show the $V_3$ and $V_4$ signals, and it is seen that, after signal $V_1$ has been delayed, both signals $V_1$ and $V_{2\,2}$ have been amplified and filtered, and, after signal $V_2$ has been inverted, the signals occur simultaneously in time, have the same magnitude, but have an opposite polarity. Thus, from FIG. 3E, it is seen that the output from rectifier 43, signal $V_5$, is essentially negligible or, in any event, less than the threshold voltage $V_T$. Thus the threshold circuit 44 is not triggered, and signal $V_6$ remains zero. This, in turn, allows the character recognition circuits 28 and the mechanical apparatus 30 to proceed in their normal manner.

Figure 4:
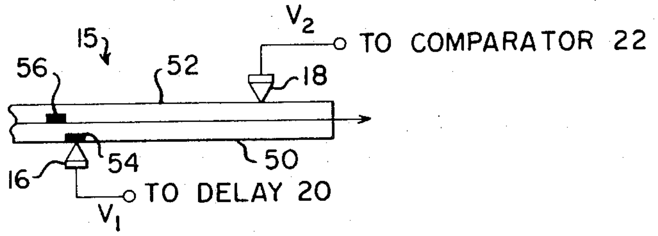
FIG. 4 shows the reading station of the system of FIG. 1 in which two documents are being read.
Figure 5:
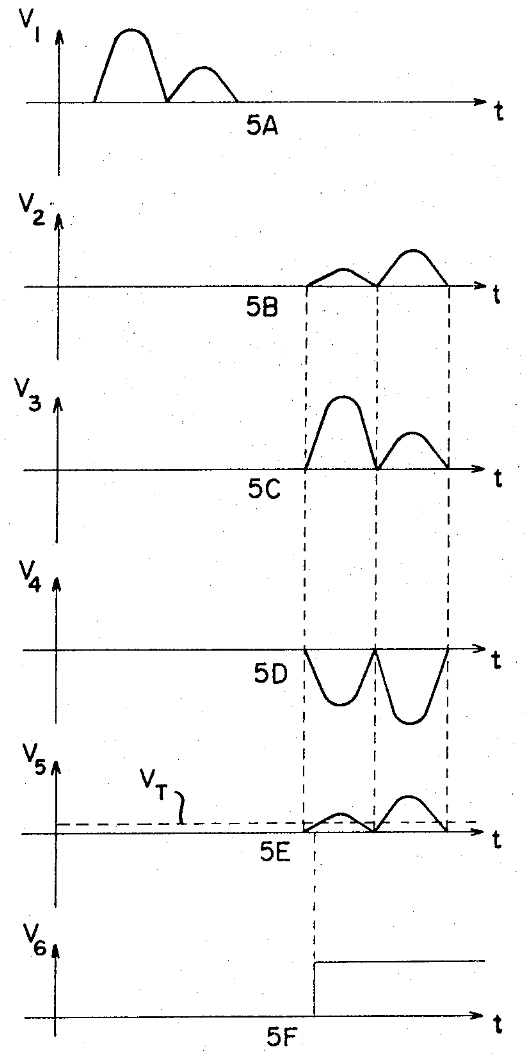
FIG. 5 shows a series of waveforms useful in understanding the system shown in FIG. 2 when two documents are being read.

Referring now to FIGS. 4 and 5, a situation is shown in which two documents are being read by the system 10, rather than the single document 12. Referring to FIG. 4, it is seen that these two documents, 50 and 52, each have a magnetic character 54 and 56, respectively, imprinted thereon, and the two documents are aligned so that the character 54 on the document 50 is scanned just prior to the character 56 on the document 52. Thus, the signals provided by each of the heads 16 and 18 have two portions, the first of which corresponds to the character 54 on the document 50 and the second of which corresponds to the character 56 on the document 52.

As seen from FIG. 5A, the first portion of signal $V_1$ has the normalized magnitude because there is very little separation between the head 16 and the character 54 of the document 50. However, the second portion of signal $V_1$ about one-half the normalized magnitude, because the head 16 and the character 56 are separated by the thickness of the document 50.

From FIG. 5B, it is seen that the situation is reversed for signal $V_2$ because the character 56 is closer to the head 18 than is the character 54. Thus the first portion of signal $V_2$ has a magnitude considerably less than one-half of the normalized magnitude, because the separation between the head 18 and the character 54 is the thickness of both documents 50 and 52, and the second portion has a magnitude of about one-half the normalized magnitude, since the separation between the head 18 and the character 56 is only the thickness of the document 52.

FIGS. 5C and 5D shown respective signals $V_3$ and $V_4$ after they have been processed by the delay network 20, the amplifiers 34 and 40, and the filters 36 and 42. It is seen here that signal $V_4$ does not have the same magnitude as signal $V_3$ because the magnitude of signal $V_2$ was, in the first portion, less than one-half of the magnitude of signal $V_1$ and, in the second portion, equal to the magnitude of signal $V_1$, and the gain of the amplifier 40 is set at two. Thus, when the signals are applied to the adder circuit 38 and the output thereof is rectified by the rectifier 43, the signal $V_5$ applied to the threshold circuit 44 is not almost negligible but, rather, has some positive value. It is seen from FIG. 5E that this value is above the threshold voltage, $V_T$, required to trigger the threshold circuit 44, and thus, when the threshold circuit 62 is triggered, the signal appearing on the line 32, which is signal $V_6$, becomes high. This, in turn, inhibits the character recognition circuits 28 and the mechanical apparatus 30, resulting in corrective action being taken, such as causing the two documents being read to fall into a reject pocket or slot.

I claim:

1. A magnetic ink character recognition double-feed detector for processing and detecting any magnetic characters imprinted on an article moving in a given direction and for detecting whether said article includes a single document or a plurality of documents, said detector comprising:

first means for reading one surface of said article and for providing a first signal representative of the magnetic characters detected while so reading;

second means for reading an opposite surface of said article and for providing a second signal representative of the magnetic characters detected while so reading, said first and second reading means being offset from one another along said given direction; and means, including means for affecting said first and second signals in such a manner that, where said article is a single document, said first and second signals have a given relationship with respect to one another, for providing an output signal whenever said first and second signals have a relationship with respect to one another substantially different from said given relationship.

2. The invention according to claim 1 wherein said signal-affecting means includes means for delaying at least one of said first or second signals and means for amplifying at least one of said first or second signals, 3. The invention according to claim 1 wherein said output signal means includes a signal-comparing means for comparing said first and second signals and for determining the relationship between said compared signals, and a threshold means responsive to said signal-comparing means for providing said output signal whenever the relationship between said compared signals is other than said given relationship.

4. In a magnetic ink character recognition system in which there is a first magnetic reading head that provides a first analog signal representative of a corresponding writing imprinted on a two-surface article while one of said two surfaces is passed adjacent to said first head and means for processing said article in accordance with said writing, an improvement comprising:

a second magnetic reading head that provides a second analog signal representative of said writing while the other of said two surfaces is passed adjacent to said second head; and signal-comparing means responsive to the application thereto of said first and second analog signals for determining whether said first and second analog signals have a predetermined relationship with respect to one another and for providing an output signal in the event said analog signals have a relationship other than said predetermined relationship.

5. In a magnetic ink character recognition system in which there is a first magnetic reading head that provides a first analog signal representative of a corresponding writing imprinted on a two-surface article while one of said two surfaces is passed adjacent to said first head and means for processing said article in accordance with said writing, an improvement comprising:

a second magnetic reading head that provides a second analog signal representative of said writing while the other of said two surfaces is passed adjacent to said second head; and signal-comparing means responsive to the application thereto of said first and second analog signals for determining whether said first and second analog signals have a predetermined relationship with respect to one another and for providing an output signal in the event said analog signals have a relationship other than said predetermined relationship;

wherein said signal-comparing means includes means responsive to the application thereto of one of said analog signals for delaying said signal by an amount directly proportional to any distance separating said two magnetic heads and inversely proportional to the speed at which said article passes said two magnetic heads, and means responsive to the application thereto of one of said analog signals for amplifying said signal by a factor which will cause said predetermined relationship to be equality.

6. The improvement according to claim 5, wherein said signal-comparing means further includes means for providing a signal whenever said predetermined relationship is other than equality.

7. In a magnetic ink character recognition system in which there is a first magnetic head that provides a first analog signal representative of a corresponding writing imprinted on a two-surface article while one of said two surfaces is passed adjacent to said first head and means for processing said article in accordance with said writing, an improvement comprising:

a second magnetic reading head that provides a second analog signal representative of said writing while the other of said two surfaces is passed adjacent to said second head; and signal-comparing means responsive to the application thereto of said first and second analog signals for determining whether said first and second analog signals have a predetermined relationship with respect to one another and for providing an output signal in the event said analog signals have a relationship other than said predetermined relationship;

wherein said article is a single document having magnetic writing on one side thereof or a plurality of documents each of which has magnetic writing on one side thereof; and wherein said signal-comparing means includes delay means responsive to the application thereto of one of said first or second analog signals for delaying said one signal by an amount directly proportional to any distance separating said first and second magnetic heads and inversely proportional to the speed at which said article passes said two magnetic heads, first amplifying means for amplifying said signal delayed by said delay means by a predetermined first factor, a second amplifying means for amplifying said other one of said first or second analog signals by a predetermined second factor, said delayed amount, said predetermined first factor, and said predetermined second factor being such that the signals provided by said two respective amplifying means are substantially identical in time of occurrence and magnitude and opposite in polarity whenever said article is a single document, adding means responsive to the application thereto of said two respective amplifying means signals for providing a signal equal to the sum of said signals so applied, and a threshold circuit for providing a signal whenever said adding means output signal exceeds a certain magnitude.

* * * * *